United States Patent
Li

(10) Patent No.: US 11,240,034 B2
(45) Date of Patent: Feb. 1, 2022

(54) CONSENSUS METHODS AND SYSTEMS IN CONSORTIUM BLOCKCHAIN

(71) Applicant: ALIPAY (HANGZHOU) INFORMATION TECHNOLOGY CO., LTD., Zhejiang (CN)

(72) Inventor: Shuai Li, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/362,982

(22) Filed: Jun. 29, 2021

(65) Prior Publication Data
US 2021/0328805 A1    Oct. 21, 2021

(30) Foreign Application Priority Data
Jul. 3, 2020 (CN) .......................... 202010629725.2

(51) Int. Cl.
*H04L 9/32* (2006.01)
*H04L 29/08* (2006.01)

(52) U.S. Cl.
CPC .......... *H04L 9/3236* (2013.01); *H04L 67/108* (2013.01); *H04L 67/1063* (2013.01);
(Continued)

(58) Field of Classification Search
CPC ............... H04L 9/3236; H04L 67/1063; H04L 67/1068; H04L 67/108
See application file for complete search history.

(56) References Cited

U.S. PATENT DOCUMENTS

2018/0365686 A1* 12/2018 Kondo .................... G06Q 20/38
2019/0377645 A1  12/2019 Abraham et al.
(Continued)

FOREIGN PATENT DOCUMENTS

CN  107528882 A  12/2017
CN  109379397 A   2/2019
(Continued)

OTHER PUBLICATIONS blog.csdn.net [online], "Why PBFT needs View Changes," Apr. 11, 2020, retrieved on Aug. 9, 2021, retrieved from URL ,https://blog.csdn.net/m0_43499523/article/details/105459149, 11 pages (machine translation included).

(Continued)

*Primary Examiner* — Ronald B Abelson
(74) *Attorney, Agent, or Firm* — Fish & Richardson P.C.

(57) ABSTRACT

A consensus method and system in a consortium blockchain is provided. An example method includes, when a first consensus node in a consensus network of the consortium blockchain does not complete a consensus operation on target data on which a consensus is to be reached within a predetermined time period, the first consensus node broadcasts a ViewChange message in the consensus network based on a P set and a Q set constructed from an ECHO message. For a received ViewChange message, a second consensus node sends a ViewChangeACK message corresponding to the received ViewChange message to a second consensus primary node. When the second consensus primary node receives N−f−2 ViewChangeACK messages from consensus nodes, the second consensus primary node obtains identical P sets and a identical Q sets in the received ViewChange message. The second consensus primary node makes a view change decision based on the received ViewChange message.

20 Claims, 2 Drawing Sheets

(52) U.S. Cl.
CPC ...... *H04L 67/1068* (2013.01); *H04L 2209/38* (2013.01); *H04L 2209/463* (2013.01)

(56) References Cited

U.S. PATENT DOCUMENTS

2020/0142765 A1  5/2020  Yang
2020/0195444 A1  6/2020  Lin

FOREIGN PATENT DOCUMENTS

CN    109784916 A    5/2019
CN    111526219 A    8/2020

OTHER PUBLICATIONS

Castro, et al., "Practical Byzantine Fault Tolerance," In Proceedings of the Third Symposium on Operating Systems Design and Implementation, Feb. 1999, 99: 173-186.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Castro et al., "Practical Byzantine Fault Tolerance and Proactive Recovery," ACM Transactions on Computer Systems (TOCS), Nov. 1, 2002, 20(4):398-461.
Extended European Search Report in European Application No. 21182641.7, dated Dec. 2, 2021, 11 pages.

\* cited by examiner

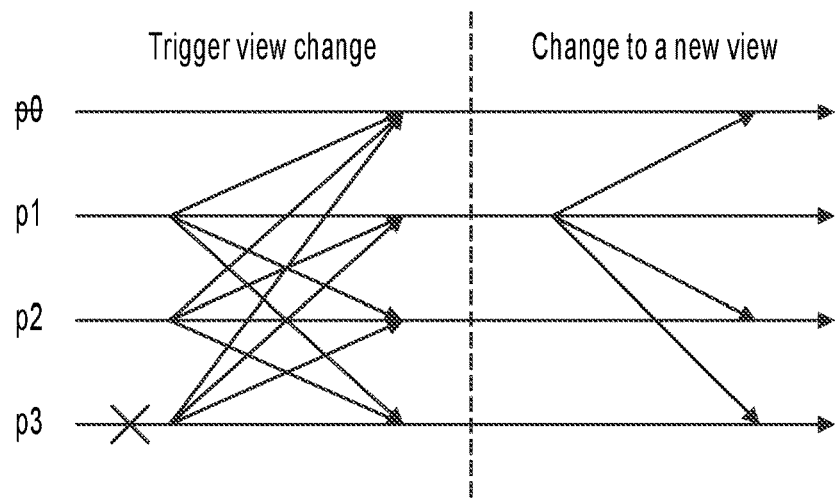

FIG. 1

```
┌─────────────────────────────────────────────────────────────┐
│ A first consensus node in a consensus network of a consortium blockchain broadcasts │
│ a ViewChange message in the consensus network based on a P set and a Q set          │──210
│ constructed from a received ECHO message when the first consensus node does not     │
│ complete a consensus operation on target data on which a consensus is to be reached │
│                    within a predetermined time period                                │
└─────────────────────────────────────────────────────────────┘
                                    ↓
┌─────────────────────────────────────────────────────────────┐
│   A second consensus node sends a ViewChangeACK message corresponding to the        │
│   received ViewChange message to a second consensus primary node for the received   │──220
│                              ViewChange message                                      │
└─────────────────────────────────────────────────────────────┘
                                    ↓
┌─────────────────────────────────────────────────────────────┐
│    The second consensus primary node obtains a plurality of identical P sets and a  │
│  plurality of identical Q sets in the received ViewChange message when receiving N-f-2 │──230
│      ViewChangeACK messages sent by consensus nodes in the consensus network        │
└─────────────────────────────────────────────────────────────┘
                                    ↓
┌─────────────────────────────────────────────────────────────┐
│   The second consensus primary node makes a view change decision based on the       │
│      plurality of identical P sets and the plurality of identical Q sets in the received │──240
│                              ViewChange messages                                     │
└─────────────────────────────────────────────────────────────┘
```

FIG. 2

CONSENSUS METHODS AND SYSTEMS IN CONSORTIUM BLOCKCHAIN

CROSS-REFERENCE TO RELATED APPLICATIONS

This application claims priority to Chinese Patent Application No. 202010629725.2, filed on Jul. 3, 2020, which is hereby incorporated by reference in its entirety.

TECHNICAL FIELD

The present specification relates to the field of computer technologies, and in particular, to consensus methods and systems in a consortium blockchain.

BACKGROUND

At present, the practical Byzantine fault tolerance (PBFT) mainly includes two parts: a normal case phase and a view change phase. The normal case phase includes pre-prepare, prepare, and commit stages to complete a consensus.

In the pre-prepare stage, a consensus primary node initiates a proposal, and sends a pre-prepare message for the proposal to each backup consensus node. In the prepare stage, each backup consensus node verifies the received pre-prepare message, and after the verification succeeds, sends a prepare message to other backup consensus nodes and the consensus primary node. In the commit stage, the backup consensus node or the consensus primary node receives one pre-prepare message and prepare messages of not less than 2f consensus nodes, and if the verification succeeds, sends a commit message to other consensus nodes in the consortium blockchain.

However, if the consensus operation on the target proposal is not completed within a predetermined time period, the consensus node in the consensus network can trigger a view change operation to attempt to change the consensus primary node. However, in PBFT with a no-signature mechanism, further solutions still need to be provided to enable the consensus primary node to make an accurate view change decision after the view change.

SUMMARY

Embodiments of the present specification provide consensus methods and systems in a consortium blockchain to solve a problem of how to ensure that a consensus primary node makes an accurate view change decision after a view change operation in the existing consortium blockchain after a NewView stage.

In order to solve the previously described technical problem, the embodiments of the present specification are implemented as follows:

In a first aspect, a consensus method in the consortium blockchain is provided, including the following.

When a first consensus node in a consensus network of the consortium blockchain does not complete a consensus operation on target data on which a consensus is to be reached within a predetermined time period, the first consensus node broadcasts a view change (ViewChange) message in the consensus network based on a P set and a Q set constructed from received ECHO messages, where the first consensus node is a consensus node other than a first consensus primary node corresponding to a current view of the consensus network when the ViewChange message is triggered, and the ECHO messages received by the first consensus node are broadcast by consensus nodes in the consensus network for the target data on which a consensus is to be reached; a second consensus node sends a view change acknowledgment (ViewChangeACK) message corresponding to the received ViewChange message to a second consensus primary node for the received ViewChange message, where the second consensus primary node is a consensus primary node after the first consensus primary node; when the second consensus primary node receives N−f−2 ViewChangeACK messages sent by consensus nodes in the consensus network, the second consensus primary node obtains a plurality of identical P sets and a plurality of identical Q sets in the received ViewChange message, where f is the maximum quantity of abnormal consensus nodes allowed in the consensus network; and the second consensus primary node makes a view change decision based on the plurality of identical P sets and the plurality of identical Q sets in the received ViewChange message.

In a second aspect, a system in a consortium blockchain is provided, including: a first consensus node in a consensus network of the consortium blockchain, configured to broadcast a view change (ViewChange) message in the consensus network based on a P set and a Q set constructed from received ECHO messages when the first consensus node does not complete a consensus operation on target data on which a consensus is to be reached within a predetermined time period, where the first consensus node is a consensus node other than a first consensus primary node corresponding to a current view of the consensus network when the ViewChange message is triggered, and the ECHO messages received by the first consensus node are broadcast by consensus nodes in the consensus network for the target data on which a consensus is to be reached; a second consensus node, configured to send a ViewChangeACK message corresponding to the received ViewChange message to a second consensus primary node for the received ViewChange message, where the second consensus primary node is a consensus primary node after the first consensus primary node; and a second consensus primary node, configured to obtain a plurality of identical P sets and a plurality of identical Q sets in the received ViewChange message when the second consensus primary node receives N−f−2 ViewChangeACK messages sent by consensus nodes in the consensus network, where f is the maximum quantity of abnormal consensus nodes allowed in the consensus network; and make a view change decision based on the plurality of identical P sets and the plurality of identical Q sets in the received ViewChange message.

The embodiments of the present specification can achieve at least the following technical effects by using the previously described technical solutions:

By using the consensus method provided by the embodiments of the present specification, when the first consensus node in the consensus network of the consortium blockchain does not complete the consensus operation on the target data on which a consensus is to be reached within the predetermined time period, the first consensus node broadcasts the view change (ViewChange) message in the consensus network based on the P set and the Q set constructed from the received ECHO messages; for the received ViewChange message, the second consensus node sends the ViewChangeACK message corresponding to the received ViewChange message to the second consensus primary node, where the second consensus primary node is the consensus primary node after the first consensus primary node; when the second consensus primary node receives the N−f−2 ViewChangeACK messages sent by the consensus node in the consensus network, the second consensus primary node obtains the plurality of identical P sets and the plurality of identical Q sets in the received ViewChange message, where f is the maximum quantity of abnormal consensus nodes allowed in the consensus network; and the second consensus primary node makes the view change decision based on the plurality of identical P sets and the plurality of identical Q sets in the received ViewChange message, so that the second consensus primary node can accurately make the view change decision after the view change.

BRIEF DESCRIPTION OF DRAWINGS

The accompanying drawings described here are used to provide a further understanding of the present specification, and constitute a part of the present specification. The example embodiments of the present specification and descriptions thereof are used to explain the present specification, and are not intended to constitute an undue limitation on the present specification. In the accompanying drawings:

FIG. 1 is a schematic flowchart illustrating view change in the existing PBFT;

FIG. 2 is a schematic flowchart illustrating implementation of a consensus method in a consortium blockchain, according to some embodiments of the present specification;

DESCRIPTION OF EMBODIMENTS

Figure 3:
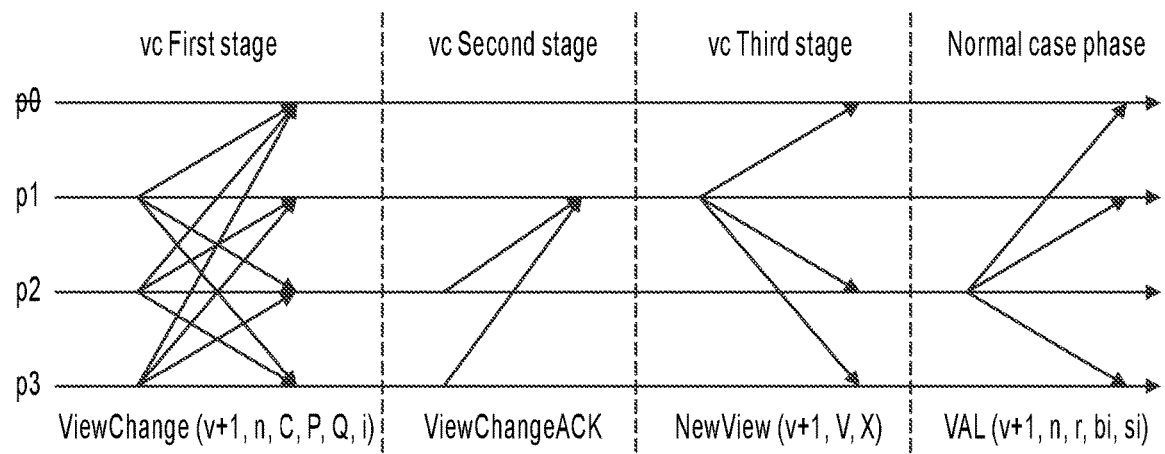
FIG. 3 is a schematic diagram illustrating an actual scenario to which a consensus method in a consortium blockchain is applied, according to some embodiments of the present specification.

To make the objectives, technical solutions, and advantages of the present specification clearer, the following clearly and comprehensively describes the technical solutions of the present specification with reference to the embodiments and corresponding accompanying drawings of the present specification. Clearly, the described embodiments are merely some rather than all of the embodiments of the present specification. All other embodiments obtained by a person of ordinary skill in the art on the basis of the embodiments of the present specification without creative efforts shall fall within the protection scope of the present specification.

The technical solutions provided in the embodiments of the present specification are described in detail below with reference to the accompanying drawings.

As shown in FIG. 1, FIG. 1 is a schematic flowchart illustrating view change in the existing PBFT algorithm. In a consensus network shown in FIG. 1, four consensus nodes p0, p1, p2, and p3 are included, where p0 is a consensus primary node before the view change and p3 is an abnormal consensus node in the consensus network.

In FIG. 1, if consensus primary node p0 does evil, consensus primary node p0 may assign the same sequence number to different requests, or does not assign sequence numbers, or causes adjacent sequence numbers to be discontinuous. Backup consensus nodes (p1 to p3) in the consensus network should have responsibility to proactively check the validity of these sequence numbers. The view change can be triggered by a backup consensus node (any one of the consensus node p1 to consensus node p3) in the consensus network if the backup consensus node detects that the consensus primary node p0 is offline or does not broadcast a request of a client device by doing evil, and a consensus operation requested by the client device is not completed on the data within a predetermined time period, i.e., time-out occurs. A specific process can include:

The backup consensus node broadcasts a view change (ViewChange) message in the format of a <VIEW-CHANGE, v+1, n, C, P, i> message to other consensus nodes, where n is the latest stable checkpoint number, i.e., a block number corresponding to data that is subjected to a consensus operation currently, C is a set of N−f verified CheckPoint messages, and P is a set of pre-prepare and prepare messages of a currently uncompleted request of the backup consensus node.

When a new consensus primary node p=v+1 mod |R| receives 2f valid ViewChange messages after the view change, the new consensus primary node can broadcast a <NEW-VIEW, v+1, V, O> message to the other consensus nodes, where V is a set of valid ViewChange messages, and O is a set of uncompleted pre-prepare messages re-initiated by the consensus primary node. A selection rule of a pre-prepare message set is as follows:

1. The minimum stable checkpoint number min-s in V and the maximum number max-s of prepare messages in V are selected.

2. If a P message set exists between min-s and max-s, a <<pre-prepare, v+1, n, d>, m> message is created. Otherwise, a null pre-prepare message is created, i.e., <<pre-prepare, v+1, n, d (null)>, m (null)>, m (null) is a null message, and d (null) is a null message digest.

When receiving a NewView message of the new consensus primary node after the view change, the backup consensus node verifies the validity, and on the premise that the verification is valid, enters a new view state after the view change, i.e., a new view state with a view number v+1, and starts a pre-prepare message process flow in O.

However, in PBFT with a no-signature mechanism, further solutions still need to be provided to enable the consensus primary node to make an accurate view change decision after the view change.

By using the consensus method provided by the embodiments of the present specification, when the first consensus node in the consensus network of the consortium blockchain does not complete the consensus operation on the target data on which a consensus is to be reached within the predetermined time period, the first consensus node broadcasts a view change (ViewChange) message in the consensus network based on a P set and a Q set constructed from received ECHO messages; for the received ViewChange message, a second consensus node sends a ViewChangeACK message corresponding to the received ViewChange message to the second consensus primary node, where the second consensus primary node is a consensus primary node after the first consensus primary node; when the second consensus primary node receives N−f−2 ViewChangeACK messages sent by consensus nodes in the consensus network, the second consensus primary node obtains a plurality of identical P sets and a plurality of identical Q sets in the received ViewChange message, where f is the maximum quantity of abnormal consensus nodes allowed in the consensus network; and the second consensus primary node makes a view change decision based on the plurality of identical P sets and the plurality of identical Q sets in the received ViewChange message, so that the second consensus primary node can accurately make the view change decision after the view change.

Specifically, FIG. 2 is a schematic flowchart illustrating implementation of the consensus method in the consortium blockchain, according to one or more embodiments of the present specification, including:

Step 210. The first consensus node in the consensus network of the consortium blockchain broadcasts the ViewChange message in the consensus network based on the P set and the Q set constructed from the received ECHO messages when the first consensus node does not complete the consensus operation on the target data on which a consensus is to be reached within the predetermined time period.

The first consensus node is a consensus node other than the first consensus primary node corresponding to the current view of the consensus network when the ViewChange message is triggered, and the ECHO messages in the P set and the Q set are broadcast by the consensus nodes in the consensus network for the target data on which a consensus is to be reached.

It should be understood that the ECHO messages in the P set and the Q set are ECHO messages corresponding to the target data on which a consensus is to be reached and that has not completed the consensus in one view before the first consensus node triggers the view change.

As shown in FIG. 3, FIG. 3 is a schematic diagram illustrating the consensus method in the consortium blockchain, according to some embodiments of the present specification. In FIG. 3, the first consensus primary node before the first consensus node triggers the ViewChange message is P0, and the second consensus primary node after the first consensus node successfully triggers the ViewChange message is P1. In a first stage of the view change vc shown in FIG. 3, the consensus nodes in the consensus network other than the first consensus primary node can broadcast the ViewChange message in the consensus network after satisfying a timeout mechanism of respective consensus node.

Taking one of the consensus nodes as an example, i.e., the first consensus node as an example, the format of the ViewChange message broadcast by the first consensus node is ViewChange (v+1, n, C, P, i), where v+1 is the view number after the view change, n is the block number corresponding to target consensus data, C is a set of N−f verified CheckPoint messages, data in the P set includes data prepared by the first consensus node in the view with a view number v, and the data in the Q set includes the data pre-prepared by the first consensus node in the view with the view number v.

A prepared state is used to indicate that the first consensus node receives N−f ECHO messages for the target data on which a consensus is to be reached, the P set includes the N−f ECHO messages corresponding to <n, r, v> received by the first consensus node, n is the block number of the data on which a consensus is to be reached corresponding to the N−f ECHO messages, r is a root hash of a Merkle tree formed by the data on which a consensus is to be reached corresponding to the N−f ECHO messages, and v is a current view number; and a pre-prepared state is used to indicate that the first consensus node receives N−2f ECHO messages for the target data on which a consensus is to be reached, where the Q set includes the N−2f ECHO messages received by the first consensus node corresponding to <n, r, v>, n is the block number of the data on which a consensus is to be reached corresponding to the N−f ECHO messages, r is the root hash of the Merkle tree formed by the data on which a consensus is to be reached corresponding to the N−f ECHO messages, and v is the current view number.

As shown in FIG. 3, the first consensus node can be any one of consensus nodes in the consensus network other than the first consensus primary node, i.e., any one of the consensus node P1 to consensus node P3. Because P0 is failed in this case, and another consensus node, i.e., the first consensus node broadcasts the ViewChange message in the consensus network, and the quantity of other consensus nodes P2 and P3 in the consensus network is less than 3, i.e., 2f+1, the other consensus nodes P2 and P3 in the consensus network cannot complete the consensus operation on the target data on which a consensus is to be reached. In other words, P2 and P3 also broadcast ViewChange messages in the consensus network after satisfying the timeout mechanism of the consensus node P2 and the consensus node P3 respectively.

It should be understood that during each round of the consensus operation, each consensus node participating in the consensus in the consensus network has its own timeout mechanism, i.e., a timeout period can be predetermined for each consensus node in the consensus network. In the timeout period after the start of a round of consensus, the consensus node in the consensus network does not complete the consensus operation on the data on which a consensus is to be reached in the round of consensus operation because the consensus primary node does evil or is offline and the like, the consensus node broadcasts the ViewChange message in the consensus network. When at least f+1 consensus nodes in the consensus network all broadcast ViewChange messages, a primary node change operation, i.e., changing the current consensus primary node, of the consensus network will be triggered, i.e., changing the current consensus primary node.

In other words, when f+1 first consensus nodes in the consensus network of the consortium blockchain do not complete the consensus operation on the target data on which a consensus is to be reached within the predetermined time period, the f+1 first consensus nodes broadcast respective ViewChange messages in the consensus network based on the received P set and Q set constructed from the respectively received ECHO messages, and at this time, the consensus network changes the current consensus primary node.

VAL messages and the ECHO messages received by the first consensus node are obtained through verification and broadcasting by other nodes in the consensus network for the received VAL message.

It is worthwhile to note that in a normal case phase in the embodiments of the present specification, the VAL message broadcast in the consensus network by the consensus primary node in the consensus network does not include a signature of the consensus primary node, and the signature of each transmitting end consensus node is not included in the ECHO message broadcast by the consensus node for the VAL message that is broadcast by the consensus primary node.

Optionally, in order to improve the system throughput of the consensus network and reduce network bandwidth consumption when the consensus primary node initiates the consensus operation in the consensus network, based on some embodiments of the present specification, in the normal case phase, a specified erasure coding technology is used to split the target data on which a consensus is to be reached into a plurality of orderly arranged data fragments that have the same quantity as consensus nodes in the consensus network. Specifically, before the step that the first consensus node in the consensus network broadcasts the view change (ViewChange) message in the consensus network based on the P set and the Q set constructed from the received ECHO messages, the method provided by the embodiments of the present specification further includes the following.

The first consensus primary node splits the target data on which a consensus is to be reached into the plurality of orderly arranged data fragments that have the same quantity as consensus nodes in the consensus network based on the specified erasure coding technology;

the first consensus primary node constructs the Merkle tree based on the plurality of orderly arranged data fragments; and the first consensus primary node saves the data fragments corresponding to the first consensus primary node, a corresponding Merkle tree path, and the root hash of the Merkle tree locally, and sends the VAL message including other data fragments, the corresponding Merkle tree path, and the root hash of the Merkle tree to the corresponding consensus node in the consensus network, where one data fragment corresponds to one consensus node in the consensus network.

Assume that the quantity of consensus nodes in the consensus network is N, the maximum quantity of abnormal consensus nodes allowed in the consensus network is f, and N≥3f+1. Specifically, the first consensus primary node in the consensus network can package the target data on which a consensus is to be reached as m0 message that is regarded as a target proposal and split message 0 into four data fragments (s0 to s3) by using a specified erasure coding algorithm, and the consensus primary node constructs the Merkle tree based on the hash values of the four data fragments (s0 to s3). The hash value of s0 is hash000, the hash value of s1 is hash001, the hash value of s2 is hash002, the hash value of s3 is hash003, hash (hash00, hash01)=hash00, hash (hash002, hash003)=hash01, and hash (hash01, hash02)=hash0, i.e., the root hash of the Merkle tree.

The first consensus primary node saves s0, hash value b0 (hash001, hash01) of s0 on the hash path on the Merkle tree, the hash root hash0 of the Merkle tree locally, constructs the VAL message based on other data fragments, the corresponding Merkle tree path, and the root hash of the Merkle tree, and sends the VAL message to the consensus node corresponding to the data fragment in the VAL message. Specifically, the first consensus primary node can send the first VAL message (i.e., VAL<v, n, hash0, b1, s1>) including s1, hash000, hash01, and hash0 to consensus node 1, send the second VAL message (i.e., VAL<v, n, hash0, b2, s2>) including s2, hash030, hash00, and hash0 to consensus node 2, and send the third VAL message (i.e., VAL<v, n, hash0, b3, s3>) including s3, hash020, hash00, and hash0 to consensus node 3.

Optionally, in order to improve a restoration capability of a system, in each round of the consensus operation, even if some consensus nodes do not receive the VAL message, it can be ensured that a complete transaction list on which a consensus is to be reached can still be parsed and obtained on the premise of receiving the 2f+1 ECHO messages. In some embodiments of the present specification, the consensus nodes that broadcast the ECHO messages in the consensus network further include the consensus primary node in addition to the backup consensus node. Specifically, after the first consensus primary node saves the data fragments corresponding to the first consensus primary node, the corresponding Merkle tree path, and the root hash of the Merkle tree locally and sends the VAL messages including other corresponding data fragments, the corresponding Merkle tree path, and the root hash of the Merkle tree to the corresponding consensus nodes in the consensus network, the method provided by the embodiments of the present specification further includes:

The consensus node that receives the VAL message constructs the ECHO message for the received VAL message and broadcasts the constructed ECHO message in the consensus network, where the constructed ECHO message includes the data fragment, the corresponding Merkle tree path, and the root hash of the Merkle tree in the received VAL message; and the first consensus primary node constructs an ECHO message based on the locally saved data fragment, corresponding Merkle tree path, and root hash of the Merkle tree and broadcasts the constructed ECHO message in the consensus network.

Continuing with the previously described example, the backup consensus node that receives the VAL message can construct the ECHO message including the received data fragment, the corresponding Merkle tree path, and the root hash of the Merkle tree based on the received VAL message after verifying the received VAL message, and broadcast the constructed ECHO message to other consensus nodes in the consensus network. The first consensus primary node can construct the ECHO message including the data fragment with the order corresponding to the order of the present consensus node, the corresponding Merkle tree path, and the root hash of the Merkle tree based on the locally saved VAL message and broadcast the constructed ECHO message to other consensus nodes in the consensus network.

Step 220. The second consensus node sends a ViewChangeACK message corresponding to the received ViewChange message to the second consensus primary node for the received ViewChange message, where the second consensus primary node is the consensus primary node after the first consensus primary node.

The second consensus node is another consensus node other than the second consensus primary node in the consensus network. In the second stage of the view change vc shown in FIG. 3, after receiving the ViewChange message broadcast by other consensus nodes in the consensus network, both of the second consensus node p2 and the second consensus node p3 send the ViewChangeACK message corresponding to the received ViewChange message to the second consensus primary node.

It is worthwhile to note that in some embodiments of the present specification, the message transmitted between the consensus nodes in the consensus network does not contain the signature of the consensus node, and the message authentication between every two consensus nodes can be performed on messages transmitted between the consensus nodes by the MAC. However, in order to ensure that the ViewChange message broadcast by the first consensus node in the consensus network is received by other consensus nodes in the consensus network, based on some embodiments of the present specification, a view change acknowledgment step can be added in a view change process, i.e., after receiving the ViewChange message broadcast by other consensus nodes each time, the consensus node in the consensus network returns the ViewChangeACK message to the second consensus primary node after the view change, so that the second consensus primary node can determine which consensus nodes receive the ViewChange message and the quantity of received ViewChange messages in the consensus network.

Step 230. The second consensus primary node obtains the plurality of identical P sets and the plurality of identical Q sets in the received ViewChange message when receiving N−f−2 ViewChangeACK messages sent by consensus nodes in the consensus network, where f is the maximum quantity of abnormal consensus nodes allowed in the consensus network.

It should be understood that since the consensus algorithm used by the embodiments of the present specification is in the no-signature mechanism, in order to ensure that the ViewChange messages sent by the transmitting end consensus node can be received by a receiving end consensus node, and the second consensus primary node can make the view change decision based on a sufficient quantity of ViewChange messages sent by the consensus nodes, when receiving the ViewChange message sent by another consensus node each time, the consensus node in the consensus network feeds back one ViewChangeACK message to the second consensus primary node. When at least f+1 consensus nodes in the consensus network all broadcast ViewChange messages in the consensus network, the view change operation that is used to change the consensus primary node can be triggered. When at least f+1 consensus nodes in the consensus network all broadcast ViewChange messages in the consensus network, the second consensus primary node can receive the N−f−2 ViewChangeACK messages respectively fed back by other consensus nodes, where two reduced consensus nodes in N−f−2 are the transmitting end consensus node and the second consensus primary node.

Because the no-signature mechanism is used in the consensus process in some embodiments of the present specification, the second consensus primary node cannot determine the data that has not completed the consensus in the last round of the consensus operation based on one single ViewChange message, but can determine the data on which a consensus is to be reached after the view change in the next round of the consensus operation by determining whether the plurality of P sets and the plurality of Q sets included in the plurality of ViewChange messages received by the second consensus primary node are identical sets respectively (i.e., on the conflict-free basis).

Step 240. The second consensus primary node makes a view change decision based on the plurality of identical P sets and the plurality of identical Q sets in the received ViewChange message.

Optionally, the first consensus primary node may be an evil consensus node, that is, different data on which a consensus is to be reached is sent to different backup consensus nodes in the normal case phase, in some embodiments of the present specification, the validity of the received ViewChange message can be determined based on whether the P sets or the Q sets in the plurality of ViewChange messages are the identical sets respectively. Specifically, the step that the second consensus primary node makes a view change decision based on the plurality of identical P sets and the plurality of identical Q sets in the received ViewChange message includes the following.

The second consensus primary node obtains the plurality of identical P sets and the plurality of identical Q sets from the received ViewChange message; and if it is determined that the received ViewChange message satisfies specified conditions, the second consensus primary node broadcasts a NewView message in the consensus network.

Optionally, the specified conditions include at least one of the following:

N−f identical P sets exist in the ViewChange message received by the second consensus primary node, where N is an integer larger than or equal to 3f+1; and f+1 identical Q sets exist in the ViewChange message received by the second consensus primary node.

In some embodiments of the present specification, the previously described specified conditions can include the following.

A1: The N−f identical P sets exist in the ViewChange message received by the second consensus primary node, and the P sets are not null.

A2: The f+1 identical Q sets exist in the ViewChange message received by the second consensus primary node.

B: The N−f identical P sets exist in the ViewChange message received by the second consensus primary node, and the P sets are null.

Optionally, when the specified conditions include that the N−f identical P sets and f+1 identical Q sets exist in the ViewChange message received by the second consensus primary node, the step that the second consensus primary node broadcasts the NewView message in the consensus network includes the following: The second consensus primary node obtains the block number and the root hash corresponding to the target data on which a consensus is to be reached from the N−f identical P sets and the f+1 identical Q sets; and the second consensus primary node broadcasts the NewView message in the consensus network based on the corresponding view number after the view change, the received ViewChange message, and the block number and the root hash corresponding to the target data on which a consensus is to be reached, where the NewView message includes the corresponding view number after the view change, the ViewChange message received by the second consensus primary node, and the block number and the root hash corresponding to the target data on which a consensus is to be reached, where the format of the NewView message is NewView (v+1, V, X), v+1 is the view number after the view change, V is a set of ViewChange messages received by the second consensus primary node, X is a set of valid (v+1, n, r), r is the root hash corresponding to the target data on which a consensus is to be reached, and n is the block number corresponding to the target data on which a consensus is to be reached.

In the third stage of the view change vc shown in FIG. 3, when it is determined that the N−f identical P sets and f+1 identical Q sets exist in the received ViewChange message, the second consensus primary node broadcasts the NewView message i.e., NewView (v+1, V, X) in the consensus network, after the NewView message is broadcast, i.e., the view change operation is completed, and the consensus primary node in the consensus network is successfully changed from the first consensus primary node to the second consensus primary node.

Optionally, when the previously described specified conditions A1 and A2 are satisfied, it indicates that the target data on which a consensus is to be reached is not null, and at least one consensus node in the consensus network can be used to restore complete target data on which a consensus is to be reached. In this case, in order to avoid the problem that the consensus node that receives the NewView message needs to query other consensus nodes when finding there's no local corresponding target data on which a consensus is to be reached in X, and consequently, the consensus node that receives the NewView message needs to consume a higher bandwidth overhead to request the complete target data on which a consensus is to be reached from other consensus nodes, by using the embodiments of the present specification, the consensus node that receives the NewView message can broadcast the VAL message for the target data on which a consensus is to be reached in the consensus network after determining that the present consensus node can be used to restore and obtain the complete target data on which a consensus is to be reached.

Specifically, after the second consensus primary node broadcasts the NewView message in the consensus network, the method provided by the embodiments of the present specification further includes the following.

If the consensus node that receives NewView message determines that the f+1 identical Q sets exist in the received ViewChange message, then determines that the complete target data on which a consensus is to be reached exists in the present consensus node; the consensus node that receives the NewView message splits the target data on which a consensus is to be reached into the plurality of orderly arranged data fragments that have the same quantity as consensus nodes in the consensus network after the view change based on the specified erasure coding technology; the consensus node that receives the NewView message constructs the Merkle tree based on the plurality of orderly arranged data fragments; and the consensus node that receives the NewView message saves a data fragment corresponding to the present consensus node, the corresponding Merkle tree path, and the root hash of the Merkle tree locally, and sends the VAL messages including other corresponding data fragments, the corresponding Merkle tree path, and the root hash of the Merkle tree to the corresponding consensus nodes in the consensus network after the view change, where one data fragment corresponds to one consensus node in the consensus network after view change.

In the normal case phase shown in FIG. 3, if the consensus node P2 that receives the NewView message satisfies A2 condition, that is, the f+1 identical Q sets exist, then the complete target data on which a consensus is to be reached can be restored based on the f+1 Q sets. Because in this case, probably only P2 can restore the complete target data on which a consensus is to be reached in the consensus network, P2 is needed to split the target data on which a consensus is to be reached into the plurality of orderly arranged data fragments that have the same quantity as consensus nodes in the consensus network after the view change based on the specified erasure coding technology. P2 constructs the VAL messages with the same order as the consensus nodes based on the plurality of orderly arranged data fragments, and the format of the VAL message is VAL (v+1, n, r, bi, si), where v+1 is the view number of a current view, n is the block number corresponding to the target data on which a consensus is to be reached, r is the root hash of the Merkle tree constructed from the plurality of orderly arranged data fragments obtained by splitting the target data on which a consensus is to be reached by P2, bi is the data fragment corresponding to the receiving end consensus node, and si is the Merkle tree path of the data fragment corresponding to the receiving end consensus node in the Merkle tree.

Optionally, when the specified conditions include that the N−f identical P sets exist in the ViewChange message received by the second consensus primary node, the step that the second consensus primary node broadcasts the NewView message in the consensus network includes the following.

If the N−f identical P sets are null, the second consensus primary node determines that the target data on which a consensus is to be reached is null; and the second consensus primary node broadcasts the NewView message in the consensus network.

Optionally, when the previously described specified condition B is satisfied, i.e., the target data on which a consensus is to be reached is null, and the consensus operation does not need to be continually performed on the target data on which a consensus is to be reached. Specifically, after the second consensus node broadcasts the NewView message in the consensus network, the method provided by the embodiments of the present specification further includes the following.

The second consensus primary node splits data on which a consensus is to be reached next to the target data on which a consensus is to be reached into the plurality of orderly arranged data fragments that have the same quantity as consensus nodes in the consensus network after the view change based on the specified erasure coding technology; the second consensus primary node constructs the Merkle tree based on the plurality of orderly arranged data fragments; and the second consensus primary node saves the data fragments corresponding to the second consensus primary node, the corresponding Merkle tree path, and the root hash of the Merkle tree locally and sends the VAL message including other data fragments, the corresponding Merkle tree path, and the root hash of the Merkle tree to the corresponding consensus node in the consensus network after the view change, where one data fragment corresponds to one consensus node in the consensus network after the view change.

The data on which a consensus is to be reached next to the target data on which a consensus is to be reached can be fetched by the second consensus primary node in a transaction pool.

By using the consensus method provided by the embodiments of the present specification, when the first consensus node in the consensus network of the consortium blockchain does not complete the consensus operation on the target data on which a consensus is to be reached within the predetermined time period, the first consensus node broadcasts the view change (ViewChange) message in the consensus network based on the P set and the Q set constructed from the received ECHO message; for the received ViewChange message, the second consensus node sends the ViewChangeACK message corresponding to the received ViewChange message to the second consensus primary node, where the second consensus primary node is the consensus primary node after the first consensus primary node; when receiving the N−f−2 ViewChangeACK messages sent the consensus nodes in the consensus network, the second consensus primary node obtains the plurality of identical P sets and the plurality of identical Q sets in the received ViewChange message, where f is the maximum quantity of abnormal consensus nodes allowed in the consensus network; and the second consensus primary node makes a view change decision based on the plurality of identical P sets and the plurality of identical Q sets in the received ViewChange message, so that the second consensus primary node can accurately make the view change decision after the view change.

Figure 4:
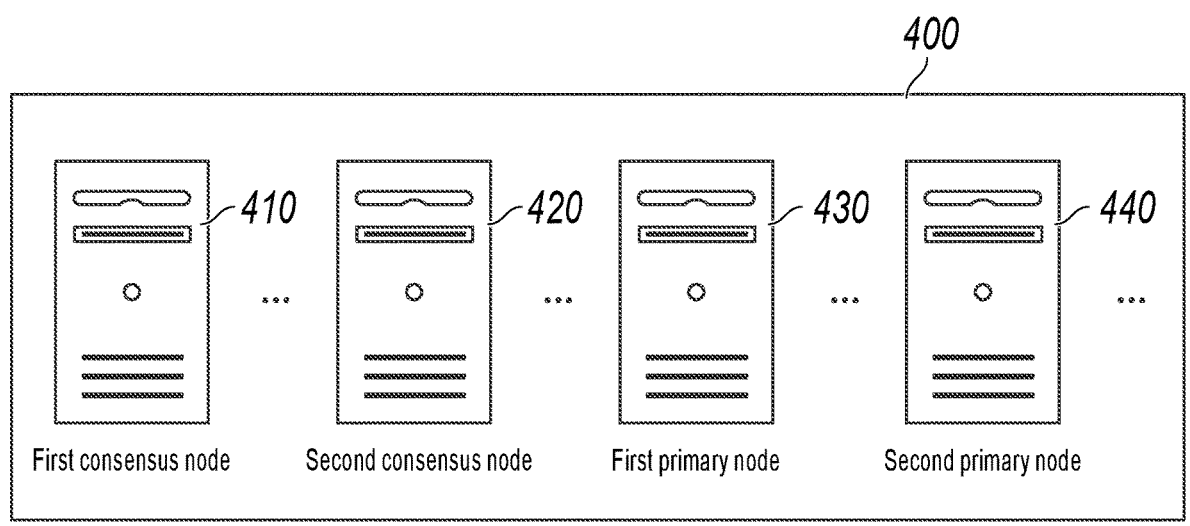
FIG. 4 is a schematic structural diagram illustrating a system in a consortium blockchain, according to some embodiments of the present specification.

FIG. 4 is a schematic structural diagram illustrating a system 400 in a consortium blockchain, according to some embodiments of the present specification. Referring to FIG. 4, in some software implementations, the system 400 in the consortium blockchain can include a first consensus node 410, a second consensus node 420, a first consensus primary node 430, and a second consensus primary node 440, where the first consensus node 410 in the consensus network of the consortium blockchain is configured to broadcast the view change (ViewChange) message in the consensus network based on the P set and the Q set constructed from the received ECHO message when the first consensus node does not complete the consensus operation on the target data on which a consensus is to be reached within the predetermined time period, where the first consensus node is the consensus node other than the first consensus primary node 430 corresponding to the current view of the consensus network when the ViewChange message is triggered, and the ECHO message received by the first consensus node is broadcast by a consensus node in the consensus network for the target data on which a consensus is to be reached; the second consensus node 420 is configured to send the ViewChangeACK message corresponding to the received ViewChange message to the second consensus primary node for the received ViewChange message, where the second consensus primary node is the consensus primary node after the first consensus primary node; and the second consensus primary node 440 is configured to obtain the plurality of identical P sets and the plurality of identical Q sets in the received ViewChange message when receiving the N−f−2 ViewChangeACK messages sent by consensus nodes in the consensus network, where f is the maximum quantity of abnormal consensus nodes allowed in the consensus network; and make the view change decision based on the plurality of identical P sets and the plurality of identical Q sets in the received ViewChange message.

Optionally, in some embodiments, before the first consensus node 410 in the consensus network broadcasts the view change (ViewChange) message in the consensus network based on the P set and the Q set constructed from the received ECHO message, the first consensus primary node 430 is configured to: split the target data on which a consensus is to be reached into the plurality of orderly arranged data fragments that have the same quantity as consensus nodes in the consensus network based on the specified erasure coding technology; construct the Merkle tree based on the plurality of orderly arranged data fragments; and save the data fragments corresponding to the first consensus primary node, the corresponding Merkle tree path, and the root hash of the Merkle tree locally and send the VAL message including other data fragments, the corresponding Merkle tree path, and the root hash of the Merkle tree to the corresponding consensus node in the consensus network, where one data fragment corresponds to one consensus node in the consensus network.

Optionally, in some embodiments, after saving the data fragments corresponding to the first consensus primary node, the corresponding Merkle tree path, and the root hash of the Merkle tree locally and sending the VAL message including other data fragments, the corresponding Merkle tree path, and the root hash of the Merkle tree to the corresponding consensus node in the consensus network, the first consensus primary node 430 is further configured to: after the consensus node that receives the VAL message constructs the ECHO message for the received VAL message and broadcasts the constructed ECHO message in the consensus network, where the constructed ECHO message includes the data fragment, the corresponding Merkle tree path, and the root hash of the Merkle tree in the received VAL message; and construct an ECHO message based on the locally saved data fragment, corresponding Merkle tree path, and root hash of the Merkle tree and broadcast the constructed ECHO message in the consensus network.

Optionally, in some embodiments, the second consensus primary node 440 is configured to: obtain the plurality of identical P sets and the plurality of identical Q sets from the received ViewChange message; and broadcast the NewView message in the consensus network if determining that the received ViewChange message satisfies the specified conditions.

Optionally, in some embodiments, the specified conditions include at least one of the following: the N−f identical P sets exist in the ViewChange message received by the second consensus primary node 440, where N is an integer greater than or equal to 3f+1; and the f+1 identical Q sets exist in the ViewChange message received by the second consensus primary node 440.

Optionally, in some embodiments, when the specified conditions include that the ViewChange message received by the second consensus primary node includes the N−f identical P sets and the f+1 identical Q sets, the second consensus primary node 440 is configured to: obtain the block number and the root hash corresponding to the target data on which a consensus is to be reached from the N−f identical P sets and the f+1 identical Q sets; and broadcast the NewView message in the consensus network based on the view number corresponding to the view after the view change, the received ViewChange message, and the block number and the root hash corresponding to the target data on which a consensus is to be reached, where the NewView message includes the view number corresponding to the view after the view change, the ViewChange message received by the second consensus primary node, and the block number and the root hash corresponding to the target data on which a consensus is to be reached.

Optionally, in some embodiments, after the second consensus primary node 440 broadcasts the NewView message in the consensus network, if the consensus node that received the NewView message determines that the f+1 identical Q sets exist in the received ViewChange message, then determines that the complete target data on which a consensus is to be reached exists in the present consensus node; the consensus node that receives the NewView message splits the target data on which a consensus is to be reached into the plurality of orderly arranged data fragments that have the same quantity as consensus nodes in the consensus network after the view change based on the specified erasure coding technology; the consensus node that receives the NewView message constructs the Merkle tree based on the plurality of orderly arranged data fragments; and the consensus node that receives the NewView message saves a data fragment corresponding to the present consensus node, the corresponding Merkle tree path, and the root hash of the Merkle tree locally and sends the VAL message including other data fragments, the corresponding Merkle tree path, and the root hash of the Merkle tree to the corresponding consensus node in the consensus network after the view change, where one data fragment corresponds to one consensus node in the consensus network after the view change.

Optionally, in some embodiments, when the specified conditions include that the N−f identical P sets exist in the ViewChange message received by the second consensus primary node 440, the second consensus primary node 440 is configured to: determine that the target data on which a consensus is to be reached is null if the N−f identical P sets are null; and broadcast the NewView message in the consensus network.

Optionally, in some embodiments, after broadcasting the NewView message in the consensus network, the second consensus primary node 440 is configured to: split the data on which a consensus is to be reached next to the target data on which a consensus is to be reached into the plurality of orderly arranged data fragments that have the same quantity as consensus nodes in the consensus network after the view change based on the specified erasure coding technology; construct the Merkle tree based on the plurality of orderly arranged data fragments; and save the data fragments corresponding to the second consensus primary node, the corresponding Merkle tree path, and the root hash of the Merkle tree locally and send the VAL message including other data fragments, the corresponding Merkle tree path, and the root hash of the Merkle tree to the corresponding consensus node in the consensus network, where one data fragment corresponds to one consensus node in the consensus network after the view change.

The methods according to the method embodiments of FIG. 2 and FIG. 3 can be implemented by using the system 400 in the consortium blockchain. For details, references can be made to the consensus methods in the consortium blockchain of some embodiments shown in FIG. 2 and FIG. 3. Details are omitted for simplicity.

In conclusion, the previous descriptions are merely preferred embodiments of the present specification, and are not intended to limit the scope of protection of the present specification. Any modification, equivalent substitution, improvement, etc. made within the spirit and principles of one or more embodiments of the present specification shall fall within the scope of the one or more embodiments of the present specification.

The systems, apparatuses, modules, or units illustrated in the previous embodiments can be implemented by using a computer chip or an entity, or can be implemented by using a product having a certain function. A typical implementation device is a computer. Specifically, the computer can be a personal computer, a laptop computer, a cellular phone, a camera phone, a smart phone, a personal digital assistant, a media player, a navigation device, an email receiving and sending device, a game console, a tablet computer, a wearable device, or any combination of these devices.

A computer readable medium includes persistent, non-persistent, movable, and unmovable media that can save information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It is worthwhile to note that the terms "comprise", "include", or any other variation thereof are intended to cover a non-exclusive inclusion, so that a process, a method, an article, or a device that includes a list of elements includes those elements and further includes other elements not expressly listed or inherent to such a process, method, product, or device. An element proceeded by the phrase "comprise a . . . " does not, without more constraints, preclude the existence of additional identical elements in the process, method, product, or device that includes the element.

The embodiments in the present specification are described in a progressive way. For same or similar parts of the embodiments, references can be made to the embodiments. Each embodiment focuses on a difference from other embodiments. Particularly, the system embodiments are similar to method embodiments, and therefore are described briefly. For a related part, references can be made to some descriptions in the method embodiments.

What is claimed is:

1. A consensus method in a consortium blockchain, comprising:
   in response to a determination that a first consensus node in a consensus network did not complete a consensus operation on target data on which a consensus is to be reached within a predetermined period, broadcasting, by the first consensus node in the consensus network of the consortium blockchain, a ViewChange message in the consensus network based on a P set and a Q set constructed from at least one ECHO message received, wherein the first consensus node is a consensus node other than a first consensus primary node corresponding to a current view of the consensus network when the ViewChange message is triggered, and the at least one ECHO message received by the first consensus node is broadcast by a consensus node in the consensus network for the target data on which the consensus is to be reached;
   sending, by a second consensus node in the consensus network, a view change acknowledgment (ViewChangeACK) message corresponding to the ViewChange message received by the second consensus node to a second consensus primary node in the consensus network for the ViewChange message received, wherein the second consensus primary node is a consensus primary node after the first consensus primary node;
   in response to a determination that the second consensus primary node receives N−f−2 ViewChangeACK messages sent by consensus nodes in the consensus network, obtaining, by the second consensus primary node, a plurality of identical P sets and a plurality of identical Q sets in the ViewChange message received, wherein f is a maximum quantity of abnormal consensus nodes allowed in the consensus network; and
   making, by the second consensus primary node, a view change decision based on the plurality of identical P sets and the plurality of identical Q sets in the ViewChange message received.

2. The method according to claim 1, wherein the method further comprises, before broadcasting, by the first consensus node, the ViewChange message in the consensus network based on the P set and the Q set constructed from the at least one ECHO message received:
   splitting, by the first consensus primary node, the target data on which the consensus is to be reached into a plurality of orderly arranged data fragments that have same quantity as consensus nodes in the consensus network based on a specified erasure coding technology;
   constructing, by the first consensus primary node, a Merkle tree based on the plurality of orderly arranged data fragments; and
   saving, by the first consensus primary node, a data fragment corresponding to the first consensus primary node, a first Merkle tree path, and a root hash of the first Merkle tree locally, and sending VAL messages comprising other corresponding data fragments, the first Merkle tree path, and the root hash of the first Merkle tree to a corresponding consensus node in the consensus network, wherein one data fragment corresponds to one consensus node in the consensus network.

3. The method according to claim 2, wherein the method further comprises, after saving, by the first consensus primary node, the data fragment corresponding to the first consensus primary node, the first Merkle tree path, and the root hash of the first Merkle tree locally, and sending the VAL messages comprising the other corresponding data fragments, the first Merkle tree path, and the root hash of the first Merkle tree to the corresponding consensus node in the consensus network:
constructing, by a consensus node in the consensus network that receives a VAL message sent by the first consensus primary node, an ECHO message for the VAL message sent by the first consensus primary node, and broadcasting the ECHO message in the consensus network, wherein the ECHO message comprises the data fragment, the first Merkle tree path, and the root hash of the first Merkle tree in the VAL message sent by the first consensus primary node; and
constructing, by the first consensus primary node, an ECHO message based on locally saved data fragment, the first Merkle tree path, and the root hash of the first Merkle tree, and broadcasting the ECHO message in the consensus network.

4. The method according to claim 3, wherein making, by the second consensus primary node, the view change decision based on the plurality of identical P sets and the plurality of identical Q sets in the ViewChange message received comprises:
obtaining, by the second consensus primary node, the plurality of identical P sets and the plurality of identical Q sets from the ViewChange message received; and
in response to a determination that the ViewChange message received satisfies specified conditions, broadcasting, by the second consensus primary node, a NewView message in the consensus network.

5. The method according to claim 4, wherein the specified conditions comprise at least one of the following:
N−f identical P sets exist in the ViewChange message received by the second consensus primary node, wherein N≥3f+1; and
f+1 identical Q sets exist in the ViewChange message received by the second consensus primary node.

6. The method according to claim 5, in response to a determination that the specified conditions comprise that N−f identical P sets and f+1 identical Q sets exist in the ViewChange message received by the second consensus primary node, the broadcasting, by the second consensus primary node, the NewView message in the consensus network comprises:
obtaining, by the second consensus primary node, a block number and a root hash corresponding to the target data on which the consensus is to be reached from N−f identical P sets and f+1 identical Q sets; and
broadcasting, by the second consensus primary node, the NewView message in the consensus network based on a view number corresponding to a view after a view change, the ViewChange message received, and the block number and the root hash corresponding to the target data on which a consensus is to be reached, wherein the NewView message comprises the view number corresponding to the view after the view change, the ViewChange message received by the second consensus primary node, and the block number and the root hash corresponding to the target data on which the consensus is to be reached.

7. The method according to claim 6, wherein the method further comprises, after broadcasting, by the second consensus primary node, the NewView message in the consensus network:
in response to a present consensus node in the consensus network determining that the present consensus node is in a pre-prepared state before the view change, determining, by a consensus node in the consensus network that receives the NewView message, that the present consensus node has complete target data on which the consensus is to be reached, wherein the pre-prepared state indicates that the consensus node receives N−2f ECHO messages for the target data on which the consensus is to be reached before the view change;
splitting, by the consensus node that receives the NewView message, the target data on which the consensus is to be reached into a plurality of orderly arranged data fragments that have same quantity as the consensus nodes in the consensus network after the view change;
constructing, by the consensus node that receives the NewView message, a second Merkle tree based on the plurality of orderly arranged data fragments; and
saving, by the consensus node that receives the NewView message, a data fragment corresponding to the present consensus node, a corresponding second Merkle tree path, and a root hash of the second Merkle tree locally, and sending a second VAL message comprising other data fragments, the corresponding second Merkle tree path, and the root hash of the second Merkle tree to a corresponding consensus node in the consensus network after the view change, wherein one data fragment corresponds to one consensus node in the consensus network after the view change.

8. The method according to claim 5, wherein broadcasting, by the second consensus primary node, the NewView message in the consensus network comprises:
in response to a determination that N−f identical P sets are null, determining, by the second consensus primary node, the target data on which a consensus is to be reached is null; and
broadcasting, by the second consensus primary node, the NewView message in the consensus network.

9. The method according to claim 8, wherein the method further comprises, after broadcasting, by the second consensus primary node, the NewView message in the consensus network:
splitting, by the second consensus primary node, next data on which a consensus is to be reached of the target data on which a consensus is to be reached into the plurality of orderly arranged data fragments that have the same quantity as consensus nodes in the consensus network after a view change based on the specified erasure coding technology;
constructing, by the second consensus primary node, a third Merkle tree based on the plurality of orderly arranged data fragments; and
saving, by the second consensus primary node, a data fragment corresponding to the second consensus primary node, a corresponding third Merkle tree path, and a root hash of the third Merkle tree locally, and sending a third VAL message comprising other data fragments, the corresponding third Merkle tree path, and the root hash of the third Merkle tree to a corresponding consensus node in the consensus network after the view change, wherein one data fragment corresponds to one consensus node in the consensus network after the view change.

10. A non-transitory, computer-readable medium storing one or more instructions executable by a computer system to perform operations comprising:
in response to a determination that a first consensus node in a consensus network did not complete a consensus operation on target data on which a consensus is to be reached within a predetermined period, broadcasting, by the first consensus node in the consensus network of a consortium blockchain, a ViewChange message in the consensus network based on a P set and a Q set constructed from at least one ECHO message received, wherein the first consensus node is a consensus node other than a first consensus primary node corresponding to a current view of the consensus network when the ViewChange message is triggered, and the at least one ECHO message received by the first consensus node is broadcast by a consensus node in the consensus network for the target data on which the consensus is to be reached;
sending, by a second consensus node in the consensus network, a view change acknowledgment (ViewChangeACK) message corresponding to the ViewChange message received by the second consensus node to a second consensus primary node in the consensus network for the ViewChange message received, wherein the second consensus primary node is a consensus primary node after the first consensus primary node;
in response to a determination that the second consensus primary node receives N−f−2 ViewChangeACK messages sent by consensus nodes in the consensus network, obtaining, by the second consensus primary node, a plurality of identical P sets and a plurality of identical Q sets in the ViewChange message received, wherein f is a maximum quantity of abnormal consensus nodes allowed in the consensus network; and
making, by the second consensus primary node, a view change decision based on the plurality of identical P sets and the plurality of identical Q sets in the ViewChange message received.

11. The non-transitory, computer-readable medium of claim 10, wherein the operations further comprise, before broadcasting, by the first consensus node, the ViewChange message in the consensus network based on the P set and the Q set constructed from the at least one ECHO message received:
splitting, by the first consensus primary node, the target data on which the consensus is to be reached into a plurality of orderly arranged data fragments that have same quantity as consensus nodes in the consensus network based on a specified erasure coding technology;
constructing, by the first consensus primary node, a Merkle tree based on the plurality of orderly arranged data fragments; and
saving, by the first consensus primary node, a data fragment corresponding to the first consensus primary node, a first Merkle tree path, and a root hash of the first Merkle tree locally, and sending VAL messages comprising other corresponding data fragments, the first Merkle tree path, and the root hash of the first Merkle tree to a corresponding consensus node in the consensus network, wherein one data fragment corresponds to one consensus node in the consensus network.

12. The non-transitory, computer-readable medium of claim 11, wherein the operations further comprise, after saving, by the first consensus primary node, the data fragment corresponding to the first consensus primary node, the first Merkle tree path, and the root hash of the first Merkle tree locally, and sending the VAL messages comprising the other corresponding data fragments, the first Merkle tree path, and the root hash of the first Merkle tree to the corresponding consensus node in the consensus network:
constructing, by a consensus node in the consensus network that receives a VAL message sent by the first consensus primary node, an ECHO message for the VAL message sent by the first consensus primary node, and broadcasting the ECHO message in the consensus network, wherein the ECHO message comprises the data fragment, the first Merkle tree path, and the root hash of the first Merkle tree in the VAL message sent by the first consensus primary node; and
constructing, by the first consensus primary node, an ECHO message based on locally saved data fragment, the first Merkle tree path, and the root hash of the first Merkle tree, and broadcasting the ECHO message in the consensus network.

13. The non-transitory, computer-readable medium of claim 12, wherein making, by the second consensus primary node, the view change decision based on the plurality of identical P sets and the plurality of identical Q sets in the ViewChange message received comprises:
obtaining, by the second consensus primary node, the plurality of identical P sets and the plurality of identical Q sets from the ViewChange message received; and
in response to a determination that the ViewChange message received satisfies specified conditions, broadcasting, by the second consensus primary node, a NewView message in the consensus network.

14. The non-transitory, computer-readable medium of claim 13, wherein the specified conditions comprise at least one of the following:
N−f identical P sets exist in the ViewChange message received by the second consensus primary node, wherein N 3f+1; and
f+1 identical Q sets exist in the ViewChange message received by the second consensus primary node.

15. The non-transitory, computer-readable medium of claim 14, wherein broadcasting, by the second consensus primary node, the NewView message in the consensus network comprises:
obtaining, by the second consensus primary node, a block number and a root hash corresponding to the target data on which the consensus is to be reached from N−f identical P sets and f+1 identical Q sets; and
broadcasting, by the second consensus primary node, the NewView message in the consensus network based on a view number corresponding to a view after a view change, the ViewChange message received, and the block number and the root hash corresponding to the target data on which a consensus is to be reached, wherein the NewView message comprises the view number corresponding to the view after the view change, the ViewChange message received by the second consensus primary node, and the block number and the root hash corresponding to the target data on which the consensus is to be reached.

16. The non-transitory, computer-readable medium of claim 15, wherein the operations further comprise, after the broadcasting, by the second consensus primary node, the NewView message in the consensus network:

in response to a present consensus node in the consensus network determining that the present consensus node is in a pre-prepared state before the view change, determining, by a consensus node in the consensus network that receives the NewView message, that the present consensus node has complete target data on which the consensus is to be reached, wherein the pre-prepared state indicates that the consensus node receives N−2f ECHO messages for the target data on which the consensus is to be reached before the view change;

splitting, by the consensus node that receives the NewView message, the target data on which the consensus is to be reached into a plurality of orderly arranged data fragments that have same quantity as the consensus nodes in the consensus network after the view change;

constructing, by the consensus node that receives the NewView message, a second Merkle tree based on the plurality of orderly arranged data fragments; and saving, by the consensus node that receives the NewView message, a data fragment corresponding to the present consensus node, a corresponding second Merkle tree path, and a root hash of the second Merkle tree locally, and sending a second VAL message comprising other data fragments, the corresponding second Merkle tree path, and the root hash of the second Merkle tree to a corresponding consensus node in the consensus network after the view change, wherein one data fragment corresponds to one consensus node in the consensus network after the view change.

17. The non-transitory, computer-readable medium of claim 14, wherein broadcasting, by the second consensus primary node, the NewView message in the consensus network comprises:

in response to a determination that N−f identical P sets are null, determining, by the second consensus primary node, the target data on which a consensus is to be reached is null; and broadcasting, by the second consensus primary node, the NewView message in the consensus network.

18. The non-transitory, computer-readable medium of claim 17, wherein the operations further comprise, after the broadcasting, by the second consensus primary node, the NewView message in the consensus network:

splitting, by the second consensus primary node, next data on which a consensus is to be reached of the target data on which a consensus is to be reached into the plurality of orderly arranged data fragments that have the same quantity as consensus nodes in the consensus network after a view change based on the specified erasure coding technology;

constructing, by the second consensus primary node, a third Merkle tree based on the plurality of orderly arranged data fragments; and saving, by the second consensus primary node, a data fragment corresponding to the second consensus primary node, a corresponding third Merkle tree path, and a root hash of the third Merkle tree locally, and sending a third VAL message comprising other data fragments, the corresponding third Merkle tree path, and the root hash of the third Merkle tree to a corresponding consensus node in the consensus network after the view change, wherein one data fragment corresponds to one consensus node in the consensus network after the view change.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

in response to a determination that a first consensus node in a consensus network did not complete a consensus operation on target data on which a consensus is to be reached within a predetermined period, broadcasting, by the first consensus node in the consensus network of a consortium blockchain, a ViewChange message in the consensus network based on a P set and a Q set constructed from at least one ECHO message received, wherein the first consensus node is a consensus node other than a first consensus primary node corresponding to a current view of the consensus network when the ViewChange message is triggered, and the at least one ECHO message received by the first consensus node is broadcast by a consensus node in the consensus network for the target data on which the consensus is to be reached;

sending, by a second consensus node in the consensus network, a view change acknowledgment (ViewChangeACK) message corresponding to the ViewChange message received by the second consensus node to a second consensus primary node in the consensus network for the ViewChange message received, wherein the second consensus primary node is a consensus primary node after the first consensus primary node;

in response to a determination that the second consensus primary node receives N−f−2 ViewChangeACK messages sent by consensus nodes in the consensus network, obtaining, by the second consensus primary node, a plurality of identical P sets and a plurality of identical Q sets in the ViewChange message received, wherein f is a maximum quantity of abnormal consensus nodes allowed in the consensus network; and making, by the second consensus primary node, a view change decision based on the plurality of identical P sets and the plurality of identical Q sets in the ViewChange message received.

20. The computer-implemented system of claim 19, wherein the operations further comprise, before broadcasting, by the first consensus node, the ViewChange message in the consensus network based on the P set and the Q set constructed from the at least one ECHO message received:

splitting, by the first consensus primary node, the target data on which the consensus is to be reached into a plurality of orderly arranged data fragments that have same quantity as consensus nodes in the consensus network based on a specified erasure coding technology;

constructing, by the first consensus primary node, a Merkle tree based on the plurality of orderly arranged data fragments; and saving, by the first consensus primary node, a data fragment corresponding to the first consensus primary node, a first Merkle tree path, and a root hash of the first Merkle tree locally, and sending VAL messages comprising other corresponding data fragments, the first Merkle tree path, and the root hash of the first Merkle tree to a corresponding consensus node in the consensus network, wherein one data fragment corresponds to one consensus node in the consensus network.

* * * * *

UNITED STATES PATENT AND TRADEMARK OFFICE
CERTIFICATE OF CORRECTION

PATENT NO. : 11,240,034 B2
APPLICATION NO. : 17/362982
DATED : February 1, 2022
INVENTOR(S) : Shuai Li It is certified that error appears in the above-identified patent and that said Letters Patent is hereby corrected as shown below:

In the Claims

Column 20, Line 41, in Claim 14, delete "N 3f+1;" and insert -- $N \geq 3f+1$; --.

Signed and Sealed this
Seventeenth Day of May, 2022

Katherine Kelly Vidal
*Director of the United States Patent and Trademark Office*